(12) United States Patent
L'Huillier et al.

(10) Patent No.: US 12,073,444 B2
(45) Date of Patent: Aug. 27, 2024

(54) METHOD AND SYSTEM FOR PROGRAMMATIC ANALYSIS OF CONSUMER REVIEWS

(71) Applicant: GROUPON, INC., Chicago, IL (US)

(72) Inventors: Gaston L'Huillier, San Francisco, CA (US); Francisco Jose Larrain, Palo Alto, CA (US); Hernan Enrique Arroyo Garcia, Mountain View, CA (US); Juzheng Li, Fremont, CA (US); Daniel Langdon, Las Condes (CL); Jonathan Esterhazy, San Francisco, CA (US); Srinivasa Raghavan Vedanarayanan, Sunnyvale, CA (US); Shawn Jeffery, Burlingame, CA (US); Feras Karablieh, Issaquah, WA (US); Bhupesh Bansal, Sunnyvale, CA (US); Dor Levi, San Francisco, CA (US); Amit Koren, Chicago, IL (US)

(73) Assignee: Bytedance Inc., Wilmington, DE (US)

( * ) Notice: Subject to any disclaimer, the term of this patent is extended or adjusted under 35 U.S.C. 154(b) by 160 days.

(21) Appl. No.: 17/132,915

(22) Filed: Dec. 23, 2020

(65) Prior Publication Data
US 2021/0256574 A1    Aug. 19, 2021

Related U.S. Application Data

(63) Continuation of application No. 15/659,138, filed on Jul. 25, 2017, now Pat. No. 10,909,585, which is a
(Continued)

(51) Int. Cl.
G06Q 30/0282    (2023.01)
G06F 16/2455    (2019.01)
(Continued)

(52) U.S. Cl.
CPC ..... G06Q 30/0282 (2013.01); G06F 16/2455 (2019.01); G06F 16/24578 (2019.01);
(Continued)

(58) Field of Classification Search
CPC ............ G06Q 30/0282; G06Q 30/0281; G06F 16/2455; G06F 16/24578; G06F 16/951; G06N 20/00
(Continued)

(56) References Cited

U.S. PATENT DOCUMENTS 5,291,593 A    3/1994    Abraham et al.
5,331,556 A    7/1994    Black et al.
(Continued)

FOREIGN PATENT DOCUMENTS

WO    2010/085773 A1    7/2010

OTHER PUBLICATIONS

"Kango Announces Series A Funding and Private Beta Status," Press Release. UpTake Networks, Inc., 2007, [Online] [Retrieved on Jun. 25, 2009] Retrieved from the Internet<URL:http://www.uptake.com/documents/press/121807.pdf>.
(Continued)

Primary Examiner — Lynda Jasmin
Assistant Examiner — Kimberly L Evans
(74) Attorney, Agent, or Firm — ALSTON & BIRD LLP

(57) ABSTRACT

Embodiments provide a computer-executable method, computer system and non-transitory computer-readable medium for programmatically analyzing a consumer review. The method includes programmatically accessing, via a network device, one or more consumer reviews for a commercial entity or a commercial object. The method also includes executing a consumer review processing engine to programmatically identify an attribute descriptor in the one or more consumer reviews, and executing the consumer review pro-
(Continued)

cessing engine to programmatically generate a sentiment score associated with the one or more consumer reviews. The method further includes storing, on a non-transitory computer-readable storage device, the attribute descriptor and the sentiment score in association with the commercial entity or the commercial object.

25 Claims, 10 Drawing Sheets

Related U.S. Application Data continuation of application No. 15/073,486, filed on Mar. 17, 2016, now Pat. No. 9,741,058, which is a continuation of application No. 14/727,852, filed on Jun. 1, 2015, now Pat. No. 9,317,566.

(60) Provisional application No. 62/033,090, filed on Aug. 4, 2014, provisional application No. 62/030,549, filed on Jul. 29, 2014, provisional application No. 62/018,456, filed on Jun. 27, 2014.

(51) Int. Cl.
*G06F 16/2457* (2019.01)
*G06F 16/951* (2019.01)
*G06N 20/00* (2019.01)
*G06Q 30/02* (2023.01)

(52) U.S. Cl.
CPC .......... *G06F 16/951* (2019.01); *G06N 20/00* (2019.01); *G06Q 30/0281* (2013.01)

(58) Field of Classification Search
USPC ......... 705/1.1, 347; 707/749, 748, 750, 739; 704/9, 235; 706/52, 12; 715/753, 524
See application file for complete search history.

(56) References Cited

U.S. PATENT DOCUMENTS

| | | | |
|---|---|---|---|
| 5,678,038 A | 10/1997 | Dockter et al. | |
| 5,706,406 A | 1/1998 | Pollock | |
| 5,864,856 A | 1/1999 | Young | |
| 5,913,208 A | 6/1999 | Brown et al. | |
| 5,963,940 A | 10/1999 | Liddy et al. | |
| 6,094,657 A | 7/2000 | Hailpern et al. | |
| 6,353,831 B1 | 3/2002 | Gustman | |
| 6,553,365 B1 | 4/2003 | Summerlin et al. | |
| 6,577,947 B1 | 6/2003 | Kronfeld et al. | |
| 6,584,464 B1 | 6/2003 | Warthen | |
| 6,757,692 B1 | 6/2004 | Davis et al. | |
| 6,826,576 B2 | 11/2004 | Lulich et al. | |
| 6,873,993 B2 | 3/2005 | Charlesworth et al. | |
| 6,910,003 B1 | 6/2005 | Arnold et al. | |
| 6,950,786 B1 | 9/2005 | Sonneland et al. | |
| 7,015,922 B2 | 3/2006 | Wada | |
| 7,107,538 B1 | 9/2006 | Hinckley et al. | |
| 7,293,017 B2 | 11/2007 | Hurst-Hiller et al. | |
| 7,340,451 B2 | 3/2008 | Sacco | |
| 7,444,356 B2 | 10/2008 | Calistri-Yeh et al. | |
| 7,552,365 B1 | 6/2009 | Marsh et al. | |
| 7,562,039 B2 | 7/2009 | Evertsz et al. | |
| 7,600,017 B2 | 10/2009 | Holtzman et al. | |
| 7,603,350 B1 | 10/2009 | Guha | |
| 7,765,097 B1 | 7/2010 | Yu et al. | |
| 7,900,213 B2 | 3/2011 | Elaasar | |
| 7,945,600 B1 | 5/2011 | Thomas et al. | |
| 8,001,144 B2 | 8/2011 | Jasmine | |
| 8,046,348 B1 | 10/2011 | Rehling et al. | |
| 8,195,683 B2 | 6/2012 | Bolivar | |
| 8,209,335 B2 | 6/2012 | Novak | |
| 8,347,326 B2 | 1/2013 | Weitzenfeld et al. | |
| 8,412,530 B2 * | 4/2013 | Pereg | G06F 40/35 |
| | | | 704/270 |
| 8,533,208 B2 | 9/2013 | Sundaresan et al. | |
| 8,645,295 B1 | 2/2014 | Dillard | |
| 8,862,591 B2 | 10/2014 | Chowdhury et al. | |
| 8,949,243 B1 * | 2/2015 | Kashyap | G06Q 30/0282 |
| | | | 707/739 |
| 8,977,953 B1 | 3/2015 | Pierre et al. | |
| 8,983,975 B2 | 3/2015 | Kenton et al. | |
| 9,020,956 B1 | 4/2015 | Barr et al. | |
| 9,063,927 B2 | 6/2015 | Hall | |
| 9,129,008 B1 | 9/2015 | Kuznetsov | |
| 9,317,566 B1 * | 4/2016 | L'Huillier | G06F 16/951 |
| | | | 707/736 |
| 9,607,325 B1 | 3/2017 | Sriram | |
| 9,741,058 B2 * | 8/2017 | L'Huillier | G06Q 30/0281 |
| | | | 707/749 |
| 9,924,102 B2 | 3/2018 | Gervautz et al. | |
| 10,002,371 B1 * | 6/2018 | Baker | G06F 16/24578 |
| | | | 707/748 |
| 10,410,224 B1 | 9/2019 | Levanon et al. | |
| 10,878,017 B1 | 12/2020 | L'Huillier et al. | |
| 10,909,585 B2 * | 2/2021 | L'Huillier | G06F 16/24578 |
| | | | 707/749 |
| 2001/0020292 A1 | 9/2001 | McRobert | |
| 2002/0010637 A1 | 1/2002 | Lieu et al. | |
| 2002/0103809 A1 | 8/2002 | Starzl et al. | |
| 2002/0107834 A1 | 8/2002 | Yen et al. | |
| 2002/0165844 A1 | 11/2002 | Lee et al. | |
| 2003/0004971 A1 | 1/2003 | Gong et al. | |
| 2003/0216919 A1 | 11/2003 | Roushar | |
| 2004/0059736 A1 | 3/2004 | Willse et al. | |
| 2004/0078190 A1 | 4/2004 | Fass et al. | |
| 2004/0153330 A1 | 8/2004 | Miller et al. | |
| 2004/0186719 A1 | 9/2004 | Polanyi et al. | |
| 2004/0243554 A1 | 12/2004 | Broder et al. | |
| 2005/0028046 A1 | 2/2005 | McArdle | |
| 2005/0060324 A1 | 3/2005 | Johnson et al. | |
| 2005/0108001 A1 | 5/2005 | Aarskog | |
| 2005/0125216 A1 | 6/2005 | Chitrapura et al. | |
| 2005/0131722 A1 | 6/2005 | Hillis et al. | |
| 2005/0149383 A1 | 7/2005 | Zacharia et al. | |
| 2005/0165819 A1 | 7/2005 | Kudoh et al. | |
| 2005/0267871 A1 | 12/2005 | Marchisio et al. | |
| 2006/0069589 A1 | 3/2006 | Nigam et al. | |
| 2006/0248440 A1 | 11/2006 | Rhoads et al. | |
| 2006/0277465 A1 | 12/2006 | Pandit et al. | |
| 2007/0027672 A1 | 2/2007 | Decary et al. | |
| 2007/0073533 A1 | 3/2007 | Thione et al. | |
| 2007/0073745 A1 | 3/2007 | Scott et al. | |
| 2007/0073758 A1 | 3/2007 | Perry et al. | |
| 2007/0094234 A1 | 4/2007 | Wen et al. | |
| 2007/0106499 A1 | 5/2007 | Dahlgren et al. | |
| 2007/0282872 A1 | 12/2007 | Probst et al. | |
| 2008/0109212 A1 | 5/2008 | Witbrock et al. | |
| 2008/0133488 A1 | 6/2008 | Bandaru et al. | |
| 2008/0154883 A1 | 6/2008 | Chowdhury et al. | |
| 2008/0201348 A1 | 8/2008 | Edmonds et al. | |
| 2008/0249764 A1 | 10/2008 | Huang et al. | |
| 2008/0270116 A1 | 10/2008 | Godbole et al. | |
| 2008/0294637 A1 | 11/2008 | Liu | |
| 2009/0063247 A1 | 3/2009 | Burgess et al. | |
| 2009/0063304 A1 | 3/2009 | Meggs | |
| 2009/0077069 A1 | 3/2009 | Polanyi et al. | |
| 2009/0112892 A1 | 4/2009 | Cardie et al. | |
| 2009/0171956 A1 | 7/2009 | Gupta et al. | |
| 2009/0193328 A1 | 7/2009 | Reis et al. | |
| 2009/0216524 A1 | 8/2009 | Skubacz et al. | |
| 2009/0217208 A1 | 8/2009 | Mushtaq et al. | |
| 2009/0222551 A1 | 9/2009 | Neely et al. | |
| 2009/0282019 A1 | 11/2009 | Galitsky et al. | |
| 2009/0319342 A1 | 12/2009 | Shilman et al. | |
| 2010/0030801 A1 | 2/2010 | Takayama et al. | |
| 2010/0038416 A1 | 2/2010 | Canora | |
| 2010/0088154 A1 | 4/2010 | Vailaya et al. | |
| 2010/0106726 A1 | 4/2010 | Huitema | |
| 2010/0198584 A1 | 8/2010 | Habu et al. | |
| 2010/0262454 A1 | 10/2010 | Sommer et al. | |
| 2011/0060746 A1 | 3/2011 | Dalvi et al. | |

(56) References Cited

U.S. PATENT DOCUMENTS

| | | | |
|---|---|---|---|
| 2011/0078167 A1 | 3/2011 | Sundaresan et al. | |
| 2011/0196927 A1 | 8/2011 | Vance | |
| 2011/0213655 A1 | 9/2011 | Henkin et al. | |
| 2012/0066233 A1 | 3/2012 | Fonseka et al. | |
| 2012/0101808 A1 | 4/2012 | Duong-Van | |
| 2012/0209828 A1 | 8/2012 | Takenaka et al. | |
| 2012/0254060 A1 | 10/2012 | Choudhary et al. | |
| 2012/0278064 A1 | 11/2012 | Leary et al. | |
| 2012/0278253 A1 | 11/2012 | Gahlot et al. | |
| 2012/0290606 A1 | 11/2012 | Kumar et al. | |
| 2012/0290910 A1 | 11/2012 | Kumar et al. | |
| 2013/0018824 A1* | 1/2013 | Ghani | G06N 20/10 706/12 |
| 2013/0018892 A1 | 1/2013 | Castellanos et al. | |
| 2013/0031062 A1 | 1/2013 | Iwamoto | |
| 2013/0066873 A1 | 3/2013 | Salvetti et al. | |
| 2013/0080208 A1 | 3/2013 | Wang et al. | |
| 2013/0103667 A1 | 4/2013 | Minh | |
| 2013/0159277 A1 | 6/2013 | Liu et al. | |
| 2013/0212105 A1 | 8/2013 | Hagiwara et al. | |
| 2013/0218822 A1 | 8/2013 | Remaker | |
| 2013/0247183 A1 | 9/2013 | Kumar et al. | |
| 2013/0263019 A1* | 10/2013 | Castellanos | G06Q 50/01 715/753 |
| 2013/0268457 A1* | 10/2013 | Wang | G06Q 30/0203 705/347 |
| 2013/0268534 A1 | 10/2013 | Mathew et al. | |
| 2013/0311315 A1 | 11/2013 | Scott | |
| 2014/0019118 A1* | 1/2014 | Tromp | G06F 40/253 704/9 |
| 2014/0067370 A1* | 3/2014 | Brun | G06F 40/211 704/9 |
| 2014/0067596 A1 | 3/2014 | McGovern et al. | |
| 2014/0136541 A1 | 5/2014 | Farahat et al. | |
| 2014/0188459 A1 | 7/2014 | Fink et al. | |
| 2014/0278786 A1 | 9/2014 | Liu-Qiu-Yan | |
| 2015/0066803 A1 | 3/2015 | Aneja et al. | |
| 2015/0100554 A1 | 4/2015 | Wang et al. | |
| 2015/0186790 A1* | 7/2015 | Ehlen | G06Q 30/02 707/750 |
| 2015/0286627 A1 | 10/2015 | Chang et al. | |
| 2015/0286710 A1 | 10/2015 | Chang et al. | |
| 2015/0286928 A1 | 10/2015 | Demiralp et al. | |
| 2015/0331937 A1* | 11/2015 | Cardie | G06F 16/93 715/254 |
| 2016/0275573 A1 | 9/2016 | L'Huillier et al. | |

OTHER PUBLICATIONS

Das, S.R. et al., "Yahoo for Amazon: Sentiment Extraction from Small Talk on the Web," Management Science, Jan. 5, 2006, pp. 1-30.

Fuchs, Gil Emanuel; "Practical Natural Language Processing Question Answering Using Graphs"; Dec. 2004; University of California.

Gamon, M., "Sentiment Classification on Customer Feedback Data: Noisy Data, Large Feature Vectors, and the Role of Linquistic Analysis," International Conference on Computational Linguistics, 2004, 7 pages.

Garcia, A. et al., Defeasible Logic Programming an Argumentative Approach, Theory and Practice of Logic Programming, (2004) [online][retrieved Dec. 14, 2015]. Retreived from the internet: <URL: http://cs.uns.edu.ar/-ajg/papers/2004TPLPGarciaSimari.pdf> 95-137.

Glance, N. et al., "Deriving Marketing Intelligence from Online Discussion," KDD '05, Aug. 21-24, 2005, Chicago, Illinois, USA, ACM, 9 pages.

In re: L'Huillier et al.; U.S. Appl. No. titled Method and System for Programmatic Analysis of Consumer Reviews; U.S. Appl. No. 62/030,549, filed Jul. 29, 2014.

In re: L'Huillier et al.; U.S. Appl. No. titled System and Method for Programmatic Generation of Attribute Descriptors; U.S. Appl. No. 62/033,090, filed Aug. 4, 2014.

In re: L'Huillier; U.S. Appl. No. titled Method and System for Programmatic Analysis of Consumer, Sentiment With Regard to Attribute Descriptions; U.S. Appl. No. 14/919,111, filed Oct. 21, 2015.

In re: Landgon et al.; U.S. Appl. No. entitled Method and System for, Programmatic Generation of Survey Queries; U.S. Appl. No. 14/752,311, filed Jun. 26, 2015.

In re: Landon et al.; U.S. Appl. No. titled Method and System for Programmatic Generation of Survey Queries; U.S. Appl. No. 62/018,456, filed Jun. 27, 2014.

In re: Patrick Ehlen; U.S. Appl. No. entitled Systems and Methods for Automatic Understanding of Consumer Evaluations of Product Attributes from Consumer-Generated Reviews; U.S. Appl. No. 61/922,786, filed Dec. 31, 2013.

International Search Report and Written Opinion for corresponding International Application No. PCT/US09/43658 dated Jul. 14, 2009, 8 pages.

Marneffe, M.C. et al., Stanford typed dependencies manual, [online][retrieved Dec. 14, 2015]. Retrieved from the internet: <URL: http://nlp.stanford.edu/software/dependencies_manual.pdf>. (Sep. 2008) 28 pages.

Opinion Mining, Sentiment Analysis, and Opinion Spam Detection [online] [retrieved Jun. 11, 2015]. Retrieved from the Internet: URL:http://www.cs.uic.edu/~liub/FBS/sentiment-analysis.html#lexicon. 8 pages.

Pang, B. et al., "Thumbs Up? Sentiment Classification Using Machine Learning Techniques," in Proceedings of the Conference on Empirical Methods in Natural Language Processing (EMNLP) 2002, Jul. 2002, Philadelphia, 8 pages.

Patent Board Decision for U.S. Appl. No. 12/119,465 dated Dec. 5, 2016, 10 pages.

Sato et al. "Topic Models with Power-Law Using Pitman-Yor Process", Jul. 25-28, 2010, KDD10, pp. 673-681.

Sentence Patterns—The Writing Center, [online], [retrieved from the Internet Sep. 28, 2018] <URL: http://writingcenter.unc.edu/tips-and-tools/sentence-patterns/> 5 pages.

SentiWordNet [online] [retrieved Jun. 11, 2015]. Retrieved from the Internet: URL:http://sentiwordnet.isti.cnr.it/. 2 pages.

Shanahan, J. et al., Computing Attitude and Affect in Text: Theory and Applications, Springer, Dordrecht, Netherlands (2006) pp. 265-279.

Wiebe, J. et al., "Identifying Collocations for Recognizing Opinions," in Proceedings of ACL/EACL '01 Workshop on Collocation, Jul. 2001, Toulouse, France, 8 pages.

Neri et al., Sentiment Analysis on Social Media, 2012 IEEE/ACM International Conference on Advances in Social Networks Analysis and Mining. (Year: 2012).

Laureen A Maines and James M. Wahlen, "The Nature of Accounting Information Reliability: Inferences from Archival and Experimental Research", 2006, Accounting Horizons vol. 20, No. 4 (Year: 2006).

* cited by examiner

800a

Great for "pasta"

Average sentiment score: 8/10

800b

People love the "sushi"

Average sentiment score: 9/10

METHOD AND SYSTEM FOR PROGRAMMATIC ANALYSIS OF CONSUMER REVIEWS

CROSS-REFERENCE TO RELATED APPLICATIONS

This application is a continuation of and claims priority to U.S. patent Application Ser. No. 15/659,138, titled "Method and System for Programmatic Analysis of Consumer Review," filed Jul. 25, 2017, which is a continuation of and claims priority to U.S. patent application Ser. No. 15/073,486, titled "Method and System for Programmatic Analysis of Consumer Review," filed Mar. 17, 2016, now U.S. Pat. No. 9,741,058, issued Aug. 22, 2017, which is a continuation of and claims priority to U.S. patent application Ser. No. 14/727,852, titled "Method and System for Programmatic Analysis of Consumer Review," filed Jun. 1, 2015, now U.S. Pat. No. 9,317,566, issued Apr. 19, 2016, which claims the benefit of U.S. Provisional Patent Application No. 62/030,549, filed Jul. 29, 2014, U.S. Provisional Patent Application No. 62/033,090, filed Aug. 4, 2014, and U.S. Provisional Patent Application No. 62/018,456, filed Jun. 27, 2014. The entire contents of all of these applications are incorporated herein by reference.

TECHNOLOGICAL FIELD

Example embodiments of the present invention relate generally to consumer reviews and, more particularly, to a computer-executable method, computer system and computer apparatus for programmatically processing and analyzing consumer reviews, presenting consumer review information in meaningful and targeted ways, and using consumer review information in recommending products, services and promotions to consumers.

BACKGROUND

Certain commercial retailers enable consumers to rate and review merchants and products. In this regard, areas for improving conventional techniques for automated processing, interpreting and using consumer review information have been identified and technical solutions have been implemented in exemplary embodiments.

BRIEF SUMMARY

In accordance with one exemplary embodiment, a computer-executable method is provided for programmatically analyzing a consumer review. The method includes programmatically accessing, via a network device, one or more consumer reviews for a commercial entity or a commercial object. The method also includes executing a consumer review processing engine to programmatically identify an attribute descriptor in the one or more consumer reviews, and executing the consumer review processing engine to programmatically generate a sentiment score associated with the one or more consumer reviews. The method further includes storing, on a non-transitory computer-readable storage device, the attribute descriptor and the sentiment score in association with the commercial entity or the commercial object.

In accordance with another exemplary embodiment, one or more non-transitory computer-readable media are provided, having encoded thereon one or more computer-executable instructions that, when executed on a computing device, performs a computer-executable method for programmatically analyzing a consumer review. The method includes programmatically accessing, via a network device, one or more consumer reviews for a commercial entity or a commercial object. The method also includes executing a consumer review processing engine to programmatically identify an attribute descriptor in the one or more consumer reviews, and executing the consumer review processing engine to programmatically generate a sentiment score associated with the one or more consumer reviews. The method further includes storing, on a non-transitory computer-readable storage device, the attribute descriptor and the sentiment score in association with the commercial entity or the commercial object.

In accordance with another exemplary embodiment, a computing system is provided. The computing system includes a non-transitory computer-readable storage device and a processor. The processor is programmed or configured for: programmatically accessing, via a network device, one or more consumer reviews for a commercial entity or a commercial object; executing a consumer review processing engine to programmatically identify an attribute descriptor in the one or more consumer reviews; executing the consumer review processing engine to programmatically generate a sentiment score associated with the one or more consumer reviews; and storing, on the non-transitory computer-readable storage device, the attribute descriptor and the sentiment score in association with the commercial entity or the commercial object.

In certain embodiments, in generating an attribute descriptor for a first commercial entity or object, one or more consumer reviews on the first commercial entity or object may be used. In certain other embodiments, in generating an attribute descriptor for a first commercial entity or object, consumer reviews on one or more additional commercial entities or objects may be used. In certain other embodiments, in generating an attribute descriptor for a first commercial entity or object, consumer reviews on the first commercial entity or object and consumer reviews on one or more additional commercial entities or objects may be used.

In certain cases, information on the first commercial entity or object may be compared to information on the additional entities or objects to determine whether information on the additional entities or objects is suitable for generating an attribute descriptor for the first entity or object. In one embodiment, certain profile data items of the entities or objects may be compared to determine if they match or overlap. For example, if two commercial entities are both Italian restaurants, then consumer reviews on one entity may be analyzed to generate an attribute descriptor for the other entity.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
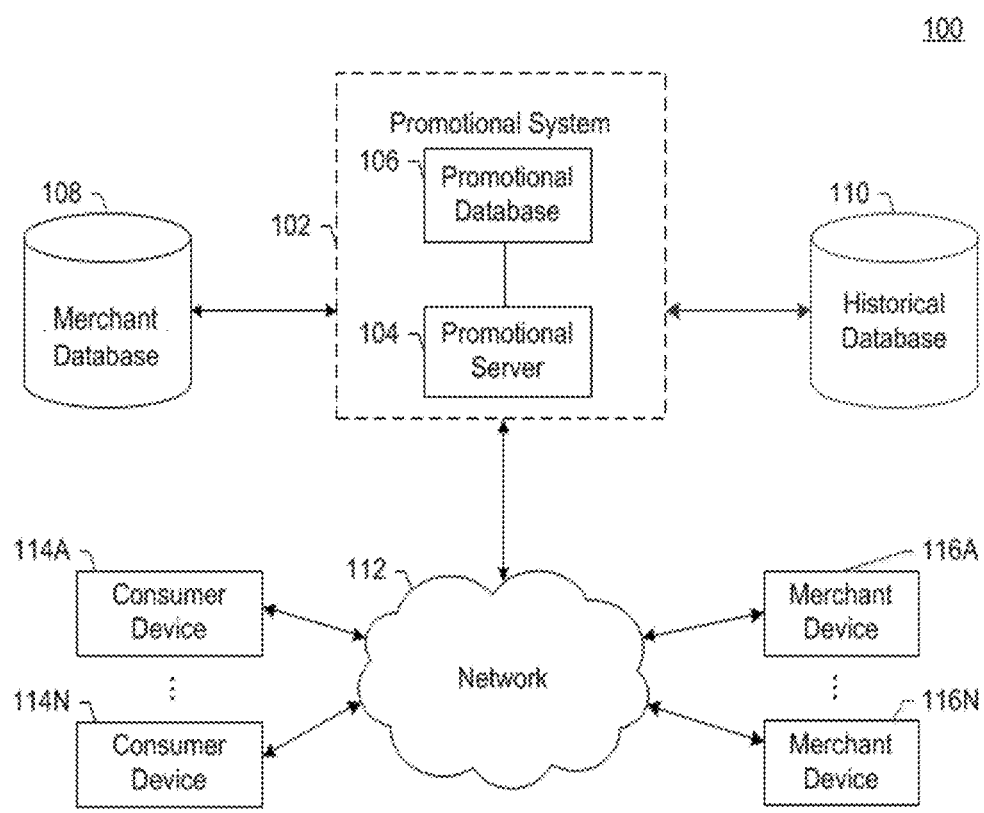
FIG. 1 is a block diagram illustrating an exemplary system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for programmatically processing, analyzing, interpreting and using consumer reviews associated with commercial entities or commercial objects. The consumer reviews may include free-text and, in some cases, an alphanumeric rating. Quantitative and/or qualitative assessments of commercial entities or objects facilitate future purchase decisions by consumers, but conventional techniques for assessing consumer review information suffer from numerous deficiencies. Certain conventional assessment techniques require a consumer to present an overall review for a merchant or product even though making a purchase decision based on an overall review is often difficult. For example, a consumer review may indicate several positive and negative sentiments about the different attribute descriptors of a merchant, and combining such sentiments into an overall impression of the merchant is non-trivial. Additionally, certain conventional techniques do not enable normalization of review information among consumers or even between qualitative and quantitative reviews from the same consumer. Furthermore, reviews are long and difficult to produce and to read, which results in few consumers writing reviews or perusing them.

Exemplary embodiments address deficiencies in conventional consumer review processing techniques by, for example, programmatically extracting one or more attribute descriptors regarding a commercial entity or object from consumer reviews. To this end, programmatically performing the functions described herein enables a consistency of evaluation could not be produced by human effort alone. For example, processing analyzing, or interpreting consumer reviews manually would likely produce results in which a first expression of a particular sentiment registers with a different perceived level of intensity as a second or subsequent expression of that particular sentiment. In at least this respect, the consistency and therefore accuracy of the solutions described herein are made possible by virtue of their computer implementation.

In some embodiments described herein, an "attribute descriptor" may be a textual piece of data regarding the commercial entity or object. Exemplary embodiments may also programmatically extract, from consumer reviews, sentiments expressed therein. Exemplary sentiments may include indications of positive sentiment (e.g., good, very good, excellent), indications of negative sentiment (e.g., bad, very bad, terrible), indications of neutral sentiment (e.g., okay), and the like. Consumer sentiments may be segmented or tiered even within the broader categories of positive, negative and neutral sentiments. In some cases, a sentiment score may be generated for a consumer review as a whole or for each attribute descriptor in the consumer review, the sentiment score being a numeric indication of the intensity of a positive or negative sentiment in a review.

In some embodiments, corpuses for exemplary attribute descriptors, positive sentiments, negative sentiments and neutral sentiments may be developed by programmatically analyzing a body of consumer reviews and extracting attribute descriptors and sentiments.

In certain cases, an attribute descriptor for a commercial entity (e.g., a merchant) may indicate a product or service sold by the merchant (e.g., "pasta," "burgers").

In certain cases, an attribute descriptor for a commercial object (e.g., a food item) may indicate a component, constituent or character of the object (e.g., vegetarian, fatty, gluten-free).

In certain cases, an attribute descriptor may indicate a contextual description or opinion describing a contextual feature or attribute of a commercial entity or object. Exemplary contextual attribute descriptors may describe, for example, a setting (e.g., attribute descriptor "romantic" may describe a restaurant as having a romantic setting), a situation, a physical environment (e.g., attribute descriptor "music"), hygiene, price level (e.g., attribute descriptor "cost"), a physical location (e.g., attribute descriptor "neighborhood safety"), and the like.

In certain cases, an attribute descriptor may indicate a quality associated with a commercial entity or object. Exemplary quality attribute descriptors may describe, for example, durability (e.g., attribute descriptor "rugged" may describe a durable pair of hiking boots), fragility (e.g., attribute descriptor "brittle"), size and/or weight (e.g., attribute descriptor "small and light"), cost effectiveness (e.g., attribute descriptor "value for money"), quality of customer service (e.g., attribute descriptor "customer service"), performance, and the like.

In certain cases, an attribute descriptor may indicate an event or happening regarding a commercial entity or object. Exemplary event attribute descriptors may indicate, for example, whether a consumer had to return a commercial object (e.g., attribute descriptor "returned it"), a consumer's specific experience (e.g., attribute descriptor "fails after 2 months"), and the like.

In certain cases, an attribute descriptor may broadly indicate a feature, categorization or sub-categorization of any feature of a commercial entity or object. Exemplary category or sub-category attribute descriptors may describe, for example, a subject matter associated with the commercial entity or object (e.g., attribute descriptor "outdoorsy" may describe an outdoor equipment retail store), a genre of a product (e.g., attribute descriptor "authentic Italian" or "fresh sushi" may describe a type of food sold by a restaurant), a feature or component of a commercial object (e.g., attribute descriptor "spicy" may describe food that is spicy, attribute descriptor "good for gaming" may describe a laptop that has a fast processor and good graphics, attribute descriptor "screen quality" may describe a laptop with a good quality screen), and the like.

In certain cases, an attribute descriptor may indicate a combination of two or more attributes of a commercial entity or object.

In certain embodiments, an attribute descriptor may have a predetermined maximum phrase, word or alphanumeric character length, e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, etc.

Certain attribute descriptors may be received, extracted or programmatically generated from consumer review information provided by consumers regarding one or more commercial entities and objects, for example, from consumer reviews, ratings and survey responses. In certain non-limiting cases, the consumer review information may be in the form of reviews that include structured or unstructured text. For structured text reviews, exemplary embodiments may programmatically generate attribute descriptors based on the names of the text fields (e.g., a text field titled "customer service" may be used to generate an attribute descriptor "customer service"). For unstructured text reviews, exemplary embodiments may programmatically generate attribute descriptors based on suitable grammatical context detection techniques. In certain cases, machine learning may be applied to determine an attribute descriptor based on consumer information previously provided for a commercial entity or object.

In certain cases, the consumer review information (e.g., reviews, ratings and survey responses) may be accessed from Internet websites using, for example, a web crawler. In certain cases, the consumer reviews, ratings and survey responses may be accessed from a database associated with a promotion and marketing service.

In certain embodiments, in generating an attribute descriptor for a first commercial entity or object, one or more consumer reviews on the first commercial entity or object may be used. In certain other embodiments, in generating an attribute descriptor for a first commercial entity or object, consumer reviews on one or more additional commercial entities or objects may be used. In certain other embodiments, in generating an attribute descriptor for a first commercial entity or object, consumer reviews on the first commercial entity or object and consumer reviews on one or more additional commercial entities or objects may be used.

In certain cases, information on the first commercial entity or object may be compared to information on the additional entities or objects to determine whether information on the additional entities or objects is suitable for generating an attribute descriptor for the first entity or object. In one embodiment, certain profile data items of the entities or objects may be compared to determine if they match or overlap. For example, if two commercial entities are both Italian restaurants, then consumer reviews of one entity may be analyzed to generate an attribute descriptor for the other entity.

One or more consumer ratings or reviews usable to determine an attribute descriptor may include one or more of: one or more quantitative ratings, one or more qualitative reviews, and the like.

In certain embodiments, a visual user interface may be customized for each consumer so that one or more commercial entities or objects are programmatically selected for display for that particular consumer. For example, attribute descriptors on the commercial entity or object may be compared to attribute descriptors of interest to the consumer to determine if the commercial entity or object is of relevance or interest to the consumer and, if so, to display consumer review information related to the commercial entity or object. For example, if an attribute descriptor for a merchant indicates that it is a "cheap" restaurant and if consumer information indicates that a consumer has a low income or is frugal, then the restaurant may be determined to be of relevance to the consumer and displayed on a computing device of the consumer.

In some embodiments, one or more attribute descriptors associated with a commercial entity or object may be displayed for a consumer. The top n number of attribute descriptors may be selected for display based on their relevance to the consumer. Certain embodiments may provide different visualization options to provide rating or review information in a succinct and easy to view manner. For example, consumers may be allowed to quickly determine the ratio between the positive and negative sentiments without having to read the attribute descriptors (e.g., by providing positive ratings in green font and negative sentiments in red font and/or by varying the font size based on the sentiment scores). Consumers may also be allowed to read individual reviews and ratings, and may be allowed to view the weights associated with the ratings. One exemplary visualization technique is a tag cloud in which each tag is an attribute descriptor and in which positive tags are provided in a first font color while negative tags are provided in a second font color and in which the font size varies with the sentiment score for each attribute descriptor.

In some cases, a consumer may be allowed to adjust the display of attribute descriptors associated with a commercial entity or object, for example, based on relevance or interest to the consumer, based on whether the attribute descriptor is spam, and the like.

I. DEFINITIONS OF TERMS

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" refers to a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" refers to a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" refers to a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "commercial entity" refers to any commercial actor including, but not limited to, an individual, a consumer, a buyer, a seller, a group of individuals, a company, a retailer, a wholesaler, a service provider, a promotion and marketing service, and the like.

As used herein, the term "commercial object" refers to any good, service or promotion that may be purchased or sold.

As used herein, the term "consumer interface" refers to any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" refers to any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "promotion score" refers to a programmatically generated quantitative or qualitative score or indication of the expected effectiveness of providing an impression of a promotion to a consumer. In some embodiments, the expected effectiveness may be indicated by a predicted probability or likelihood that the consumer will purchase the promotion offered by an impression.

As used herein, the term "impression" refers to a communication, a display, or other perceived indication, such as a flyer, print media, e-mail, text message, application alert, mobile applications, mobile notifications, other type of electronic interface or distribution channel and/or the like, of one or more promotions. For example, and using the aforementioned running company as the example provider, an e-mail communication sent to consumers that indicates the availability of a promotion of $25 for $50 toward running shoes.

As used herein, the term "voucher" refers to any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "redemption" refers to the use, exchange or other presentation of a voucher for at least a portion of a good, service or experience as defined by the voucher and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the terms "mobile computing device" and "mobile device" refer to any computing or communication device that is portable and is transported in normal usage (e.g., the iPhone™ mobile communication device, the Android™ mobile communication device, and the like), and that is capable of communication and that has sufficient processor power and memory capacity to perform the operations described herein. For example, and without limitation, a mobile computing device may include a smartphone, a table computer, a laptop computer, and the like.

As used herein, the terms "application program," "mobile application" and "mobile app" refer to computer-executable application software programmed or configured to run on a processing unit of a mobile computing device.

As used herein, the term "promotion application program" refers to an application program programmed or configured to run on a processing unit of a mobile computing device in order to enable a user of the computing device to use a promotion and marketing service. An exemplary promotion application program may be in constant or periodic communication with a remote computing device or server run by the promotion and marketing service to provide computer-executable functionality to the mobile computing device. An exemplary promotion application program may, for example, provide a user interface configured to render impressions of one or more promotions, receive user input selecting one or more impressions, and enable purchase of the promotions in response to user input.

As used herein, the term "module," encompasses hardware, software and/or firmware configured to perform one or more particular functions.

As used herein, the term "computer-readable medium" refers to a non-transitory storage hardware, non-transitory storage device or non-transitory computer system memory that may be accessed by a controller, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

II. EXEMPLARY EMBODIMENTS

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Although certain embodiments are described herein with reference to promotions and a promotion and marketing service, certain other embodiments are not thusly limited and may be implemented generally and without specific reference to promotions to a promotion and marketing service.

FIG. 1 is a block diagram illustrating an exemplary system within which exemplary embodiments may operate. An exemplary promotion and marketing service 100 may manage a promotional system 102 for managing the offer, purchase, and redemption of a set of promotions. Consumers and merchants may access the promotional system 102 via a network 112 (such as the Internet, or the like) using computer devices 114A through 114N and 116A through 116N, respectively. The promotional system 102 may include a promotional server 104 in communication with a promotional database 106 that stores the set of promotions managed by the promotion and marketing service. The promotion system 102 may have access to a merchant database or any suitable data storage structure 108 storing information on one or more merchants, one or more products offered by a merchant, one or more services offered by a merchant, and the like. The promotional system 102 may have access to a historical database or any suitable data storage structure 110 storing information regarding one or more of: promotions and impressions previously distributed to consumers, consumer profile data, prior activities performed by consumers with respect to promotions and impressions, prior activities performed by consumers with respect to commercial entities or objects, and the like. In various embodiments, promotional database 106, merchant database 108 and historical database 110 may be distinct databases, or may alternatively refer to a single database. In certain embodiments, merchant database 108 and historical database 110 may be provided independently of a promotional system 102.

Figure 2:
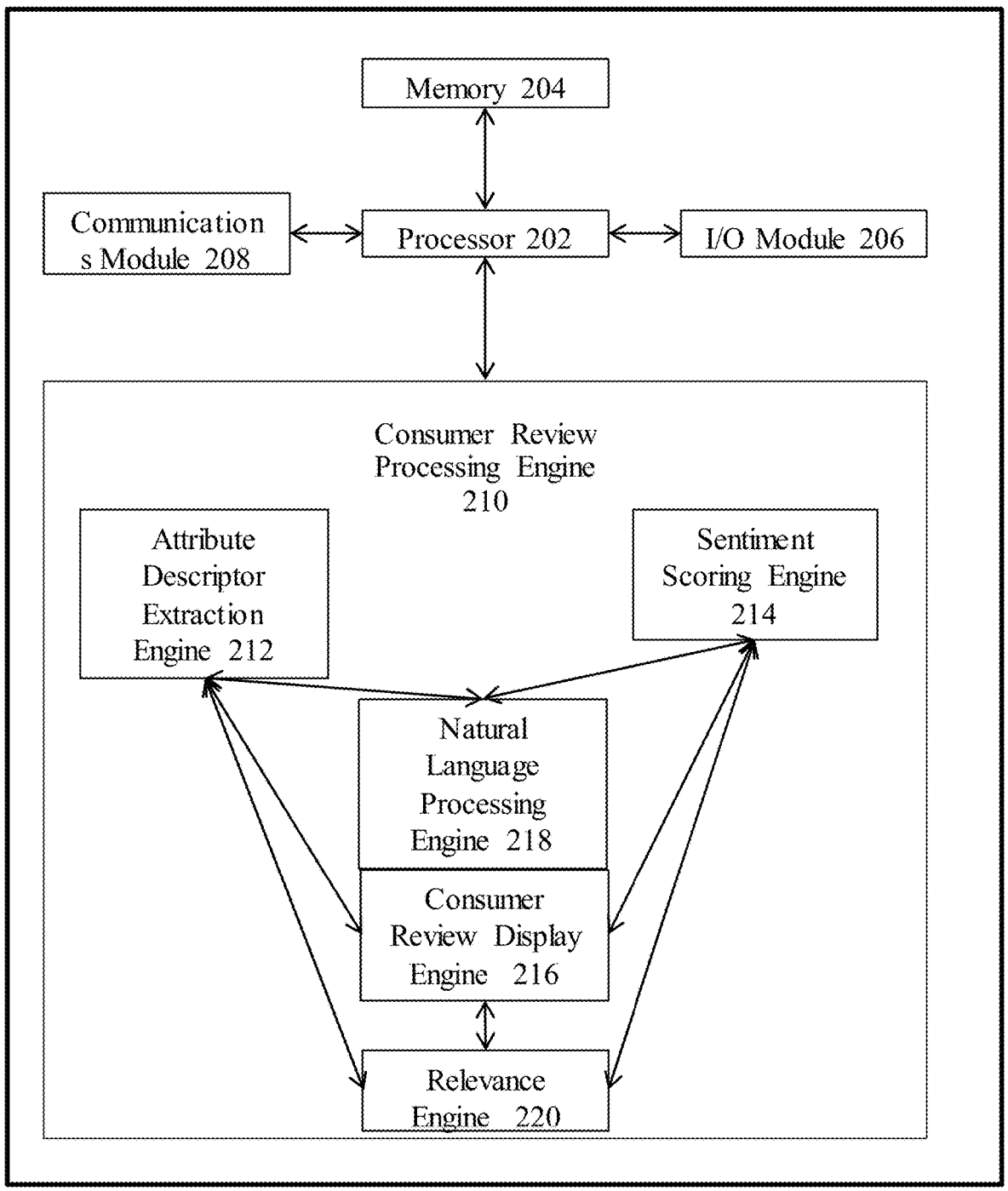
FIG. 2 is a block diagram illustrating exemplary modules of a computing device for use in a promotional server in accordance with certain exemplary embodiments.

The promotional server 104 may be embodied by a computing system, such as apparatus 200 shown in FIG. 2. As illustrated in FIG. 2, the apparatus 200 may include a computer processor or computer processing module 202, a memory 204, an input/output module 206, and a communications module 208.

In some embodiments, the apparatus 200 may include a consumer review processing engine 210 programmed or configured to programmatically and automatically process one or more consumer reviews with respect to a commercial entity or commercial object. The consumer review processing engine 210 may take as input one or more consumer reviews for a single commercial entity or commercial object, or a plurality of consumer reviews for multiple commercial entities and/or commercial objects. The consumer review processing engine 210 may extract and output one or more attribute descriptors associated with each consumer review. In some embodiments, the consumer review processing engine 210 may extract and output one or more sentiments associated with each consumer review. In some embodiments, the consumer review processing engine 210 may generate and output a sentiment score associated with each attribute descriptor in a consumer review and/or a sentiment score associated with an entire consumer review.

In some embodiments, the consumer review processing engine 210 may output an overall sentiment score for a particular commercial entity or commercial object based on sentiment scores generated from all consumer reviews for that particular commercial entity or commercial object.

The consumer review processing engine 210 may include an attribute descriptor extraction engine 212 programmed or configured to programmatically extract one or more attribute descriptors from a consumer review. The attribute descriptor extraction engine 212 may implement and run computer-executed natural language processing techniques to identify words and/or phrases that may represent aspects (or attribute descriptors) for commercial entities and/or objects. In one embodiment, an attribute descriptor extraction engine 212 may generate a numerical score indicating the importance or usefulness of the identified attribute descriptor in the consumer review. The attribute descriptor extraction engine 212 may thereby generate a set or list of all useful or important attribute descriptors identified in the consumer review. For example, a consumer review that states "excellent burgers and good margaritas" may be analyzed to generate an attribute descriptor list of "burgers, margaritas."

The consumer review processing engine 210 may include a sentiment scoring engine 214 programmed or configured to programmatically extract one or more sentiments (e.g., positive, negative, unknown/neutral) from a consumer review. In some cases, the sentiment scoring engine 214 may generate a sentiment score associated with the consumer review, the sentiment score indicating the intensity of a sentiment expressed in the review. For example, an overall positive review may be assigned a positive sentiment score, an overall negative review may be assigned a negative sentiment score, an overall neutral review may be assigned a score of zero. The magnitude of a sentiment score may indicate an intensity or strength of a sentiment expressed in the consumer review. For example, consumer reviews that state "excellent burgers" and "good burgers" may both have positive sentiments ("excellent" and "good," respectively), but the former may have a higher-magnitude positive sentiment score than the latter.

In one embodiment, a consumer review or part of a consumer review (e.g., a sentence or a phrase) may be analyzed to extract an "opinion" contained in the review. An "opinion" may be described as indicating an attribute descriptor in the review, a sentiment expressed in the review (e.g., positive, negative, neutral), an identification of the reviewer, the time of the review and an identification of the commercial entity or object being reviewed.

The consumer review processing engine 210 may include a natural language processing engine 218 programmed or configured to perform natural language processing techniques on the text of consumer reviews. The natural language processing engine 218 may be in data communication with the attribute descriptor extraction engine 212 and the sentiment scoring engine 214.

The consumer review processing engine 210 may include a consumer review display engine 216 programmed or configured to selectively display consumer review information (e.g., attribute descriptor, sentiment score) on a visual display device. Exemplary methods of displaying consumer review information are presented in connection with FIGS. 6 and 7. The consumer review display engine 216 may be in data communication with the attribute descriptor extraction engine 212 and the sentiment scoring engine 214.

The consumer review processing engine 210 may include a relevance engine 220 programmed or configured to determine a relevance of a commercial entity or object for a particular consumer based on the consumer's information and based on the commercial entity or object's consumer review information (e.g., attribute descriptor, sentiment score). Exemplary methods of displaying consumer review information are presented in connection with FIG. 7. The relevance engine 220 may be in data communication with the attribute descriptor extraction engine 212 and the sentiment scoring engine 214.

The sentiment scoring engine 214 may generate a sentiment score for a consumer review, the sentiment score being a numerical score that indicates a sentiment or feeling expressed in the consumer review. In some embodiments, an overall positive sentiment may be indicated by positive numerical scores, an overall negative sentiment may be indicated by negative numerical scores, with the magnitude of the sentiment score proportion to the intensity of the overall sentiment. Unknown or neutral sentiments may be indicated by a sentiment score of zero.

In one embodiment, a trained machine learning system may be used. In another embodiment, a set of rules based on parameterized heuristics which depend on thresholds may be used. The parameters may be trained by controlling performance metrics within a training/testing dataset.

The sentiment scoring engine 214 may programmatically process and extract one or more sentiments expressed in a consumer review. The sentiments may be associated with certain attribute descriptors in the consumer review. For example, a consumer review stating "great burgers" includes an attribute descriptor of "burgers" and a sentiment of "great" which may be categorized as a positive sentiment.

A consumer review for a commercial entity/object may include one or more textual units (e.g., sentences, phrases), each textual unit including a sentiment regarding the commercial entity/object or regarding an attribute descriptor of the commercial entity/object. The sentiment scoring engine 214 may generate a sentiment score for each textual unit in a consumer review. For example, the sentiment scoring engine 214 may take as input the entire text of a consumer review, and output a list (or array or other suitable data structure) of the sentiments scores for the different textual units of the consumer review.

In some embodiments, the processor 202 (and/or co-processor or any other processing circuitry assisting or otherwise associated with the processor) may be in communication with the memory 204 via a bus for transmitting information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may additionally or alternatively support wired communication. As such, for example, the communication interface may include a communication modem and/or other hardware/ software for supporting communication via cable, digital subscriber line (DSL), universal serial bus (USB), or other mechanisms.

In one embodiment, a consumer or merchant may use the apparatus 200 (e.g., as a kiosk) to communicate with the promotional system 102 to view promotion information or interact with promotions. However, in some embodiments of the present invention, the consumer or merchant may perform these functions from outside of the promotional system 102 using, for example, an end-user device, such as consumer device 114 or merchant device 116.

Figure 3:
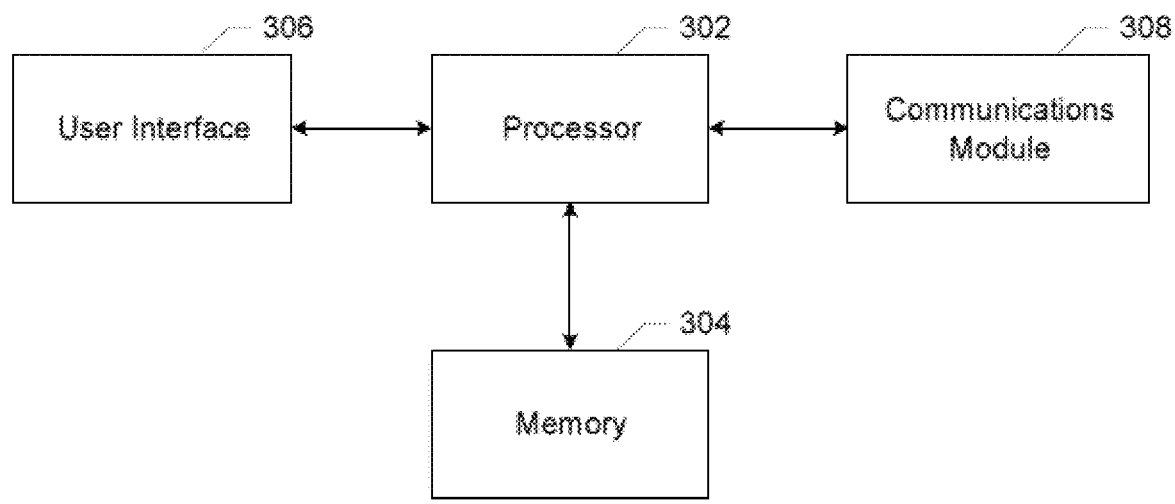
FIG. 3 is a block diagram illustrating exemplary modules of a computing device for use by a consumer or merchant in accordance with an exemplary embodiment.

Referring now to FIG. 3, a block diagram is illustrated showing an example end-user device (apparatus 300) that may be configured to enable a user to view promotions from outside the promotional system 102, in accordance with embodiments of the present invention. In FIG. 3, the apparatus 300, which may embody consumer device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface 306 may include a display and may comprise a web user interface, a mobile application, a client device, a kiosk, or the like. In some embodiments, the user interface 306 may also include a keyboard, a mouse, a touch screen, touch areas, soft keys, a microphone, a speaker, or other input/output mechanisms. The processor 302, or user interface circuitry comprising the processor 302, may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Figure 4:
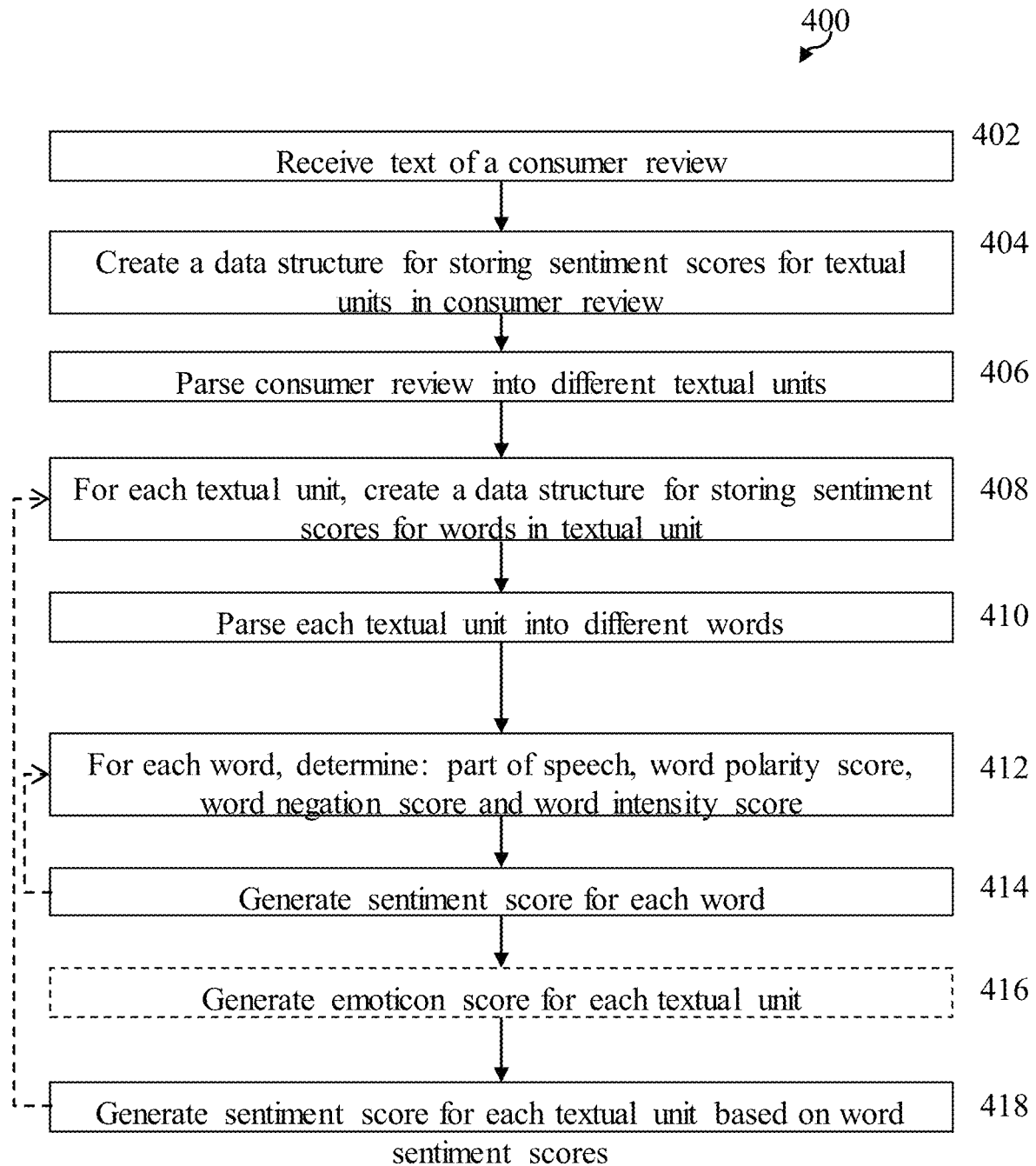
FIGS. 4 and 5 are flowcharts illustrating exemplary computer-executable methods for programmatically processing consumer reviews and generating attribute descriptors and sentiment scores therefrom.

FIG. 4 is a flowchart illustrating an exemplary computer-implemented method 400 of generating sentiment scores for each of the different textual units in a consumer review. The operations described in FIG. 4 may be performed by the promotional server 104 (i.e., by the apparatus 200). Although exemplary embodiments are described in connection with words, exemplary indicators and score may be assigned for phrases, sentences, paragraphs or sets of paragraphs as well using the techniques described herein.

In step 402, the apparatus 200 may receive a consumer review (e.g., from a non-transitory computer-readable storage device, from an external consumer computing device, via a network device, or the like). In step 404, the apparatus 200 may create a data structure (e.g., an array named spList)

for storing sentiment scores for the different textual units in the consumer review. In step 406, the apparatus 200 may programmatically parse the consumer review to split the consumer review into its different constituent textual units, for example, by detecting and splitting a series of words along period punctuations. In step 408, for each textual unit, the apparatus 200 may create a data structure (e.g., an array named wsList) for storing the sentiment scores for the different words in each textual unit, and the apparatus 200 may save the data structure on a non-transitory computer-readable storage device. In step 410, the apparatus 200 may programmatically parse each textual unit and split each textual unit into its different constituent words, for example by detecting and splitting the textual unit along spaces.

In step 412, for each word in the textual unit, the apparatus 200 may determine one or more of the following attributes: the part of speech, the word polarity score, the word negation score, and the word intensity score.

In step 412, the apparatus 200 may generate the part of speech of the word (e.g., adjective, noun) using the natural language processing engine 218. Any suitable technique for part-of-speech tagging may be used. In one example, the word may be compared to a list of predetermined parts of speech to identify its part of speech. In another example, a trained machine learning system may be implemented to apply classification algorithms to programmatically generate the part of speech. A perceptron may be used in one such classification algorithm. In machine learning, the perceptron is an algorithm for supervised classification of an input (i.e., a word) into one of several possible non-binary outputs (i.e., the different parts of speech). It is a type of linear classifier, i.e. a classification algorithm that makes its predictions based on a linear predictor function combining a set of weights with the feature vector. In another example, a hidden Markov model may be used in generating the part of speech.

In step 412, the apparatus 200 may generate a word polarity score of the word using the sentiment scoring engine 214. The word polarity score is a numerical score that indicates whether a sentiment expressed by a word, phrase, sentence, paragraph or set of paragraphs is positive, negative or neutral or unknown.

In some embodiments, the word polarity score may indicate an intensity of the sentiment expressed in the word, such that increasing magnitudes of the score indicates greater intensities. In generating the word polarity score, the sentiment scoring engine 214 may take as input the word and the part of speech of the word in the context in which it is evaluated. Word polarity scores from different sources may be aggregated to generate the word polarity score, in certain embodiments. The sources may be varied and the scores from the sources may be combined in different types. In one example, a polarity lexicon may be annotated and used. Exemplary lexicons can be found at: http://sentiwordnet.is-ti.cnr.it/ and at http://www.cs.uic.edu/~liub/FBS/sentiment-analysis.html#lexicon. The entire contents of these websites are expressly incorporated herein by reference.

In one example, the natural language processing engine 218 may determine whether the word contains multiple vowels, and increase the word polarity score for a higher number of consecutive vowels. For example, "goooood" is a common way of expressing a higher intensity than simply "good." If it is ambiguous how to map a word with multiple consecutive vowels to a more standard word (e.g., if it is unclear whether "goooood" should be mapped to "good" or "god"), then the priority of the mapping may be the next available multi-vowel word (e.g., "good"). In case a word with multiple consecutive vowels does not exist in the lexicon (e.g., "amaaaaaaaazing"), it may be mapped to the next normalized representation of the multi-vowel word (e.g., "amazing").

In step 412, the apparatus 200 may generate a word negation score of the word using the sentiment scoring engine 214 and/or the natural language processing engine 218. The word negation score is a numerical score that indicates whether there is a negation or inversion of a polarity of a given word or phrase in the context of the word or phrase (e.g., in the sentence). In one embodiment, the immediately preceding words may be analyzed. If a sentence includes the word "good," this may indicate a positive polarity score of about 1.0, but if "not" precedes "good" in the same sentence, the polarity score may need to be inverted so that it becomes the opposite value of about −1.0. In another embodiment, complex structures (e.g., parse trees) may be built from the sentences themselves to increase the actual reach of the negations so as to shift the polarity of all words within the scope of the parse trees.

In step 412, the apparatus 200 may generate a word intensity score of the word using the sentiment scoring engine 214 using the natural language processing engine 218. The word intensity score is a numerical score that indicates an intensity, strength or magnitude of a sentiment expressed in the word, and may be based on how the textual content was created. In some cases, the word intensity score may be generated based on whether the word includes multiple consecutive vowels (e.g., "sooooo good"), which may express a stronger sentiment than "so good" and may therefore be assigned a higher word intensity score. In some cases, the word intensity score may be generated based on a distortion in the writing style (e.g., if a word is written in capital letters, e.g., "VERY GOOD"), which may express a stronger sentiment than "very good" written in small letters and may therefore be assigned a higher word intensity score. In some cases, the word intensity score may be generated based on prior words in the same sentence (e.g., "very good"), which may express a stronger sentiment than "good" and may therefore be assigned a higher word intensity score. In these cases, the word is believed to express intense sentiments or feelings. In one embodiment, the immediately preceding words may be analyzed in the process of generating the word intensity score. If these words include "very" before "good," the word intensity score may be higher than otherwise. In another embodiment, complex structures (e.g., parse trees) may be built from the sentences themselves to increase the actual reach of the intensities so as to shift the polarity of all words within the scope of the parse trees (e.g., "was not as good as I expected").

In step 414, the apparatus 200 may generate a sentiment score for the word based on the word polarity score, the word negation score and the word intensity score, and the apparatus 200 may store the sentiment score in the generated data structure (e.g., wsList). In one embodiment, the word polarity score, the word intensity score and the word negation score may be aggregated (e.g., summed, multiplied) in any suitable manner. In another embodiment, a trained machine learning system may be used to generate the sentiment score based on the word polarity score, the word negation score and the word intensity score.

In step 416, after sentiment scores have been generated for all of the words in a textual unit, an emoticon score may be generated for the textual unit. In generating the emoticon score, the sentiment scoring engine 214 may take as input the textual unit, and output a score indicating the number and/or intensity of positive emoticons relative to negative emoticons found in the textual unit. In one embodiment, a text parser may be executed and run on the textual unit to identify emoticons that match predetermined emoticon patterns. Emotions may be positive or negative, and may be amplified by certain expressions. For example, ":(" expresses a sad face which is negative, while "D:" amplifies the sad or negative expression. In one embodiment, predetermined numerical scores may be assigned to the different emoticons, with positive numerical scores assigned to positive emoticons, negative numerical scores assigned to negative emoticons, and scores of greater magnitude assigned to amplified emoticons. The scores for all of the emoticons in the textual unit may be added or combined otherwise to generate the emoticon score in step 416.

In step 418, the apparatus 200 may generate a sentiment score for the textual unit as a whole, and stored in the generated data structure (e.g., spList). In generating the sentiment score for the textual unit, the sentiment scoring engine 214 may take as input the data structure storing the sentiment scores for all the words in the textual unit (e.g., wsList) and, optionally, the emoticon score generated in step 416, and output a score indicating the intensity of the sentiments expressed in the textual unit. The sentiment score may be generated by aggregating the sentiment scores for the words in the textual unit, for example, by summing the sentiment scores. In another example, a trained machine learning system may be implemented to apply scoring algorithms to programmatically generate the sentiment score for the textual unit based on one or more of the following information regarding the words in the textual unit: sentiment score, part of speech, individual polarity, negation tag, intensity score, and the like.

In one embodiment, the emoticon score may be used, for example, by summing the emoticon score of the textual unit along with the sentiment score of the words in the textual unit to generate the sentiment score for the textual unit. In another embodiment, the emoticon score may not be used in generating the sentiment score for the textual unit.

In this manner, as illustrated in FIG. 4, the apparatus 200 may generate sentiment scores for each textual unit of a consumer review.

Figure 5:
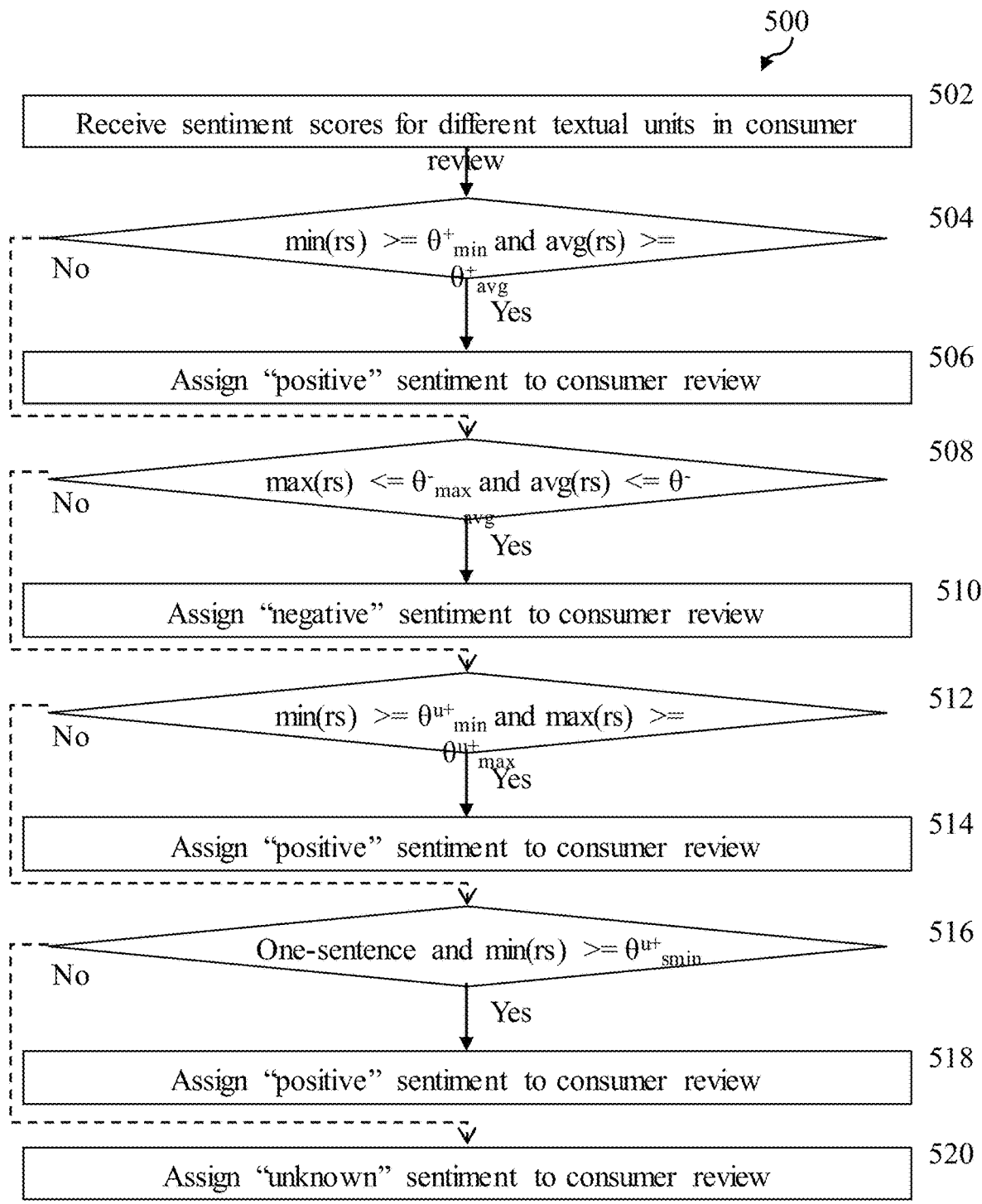

FIG. 5 is a flowchart illustrating an exemplary computer-implemented method 500 of generating a sentiment score for a consumer review based on sentiment scores for the different textual units in the consumer review. The operations described in FIG. 5 may be performed by the promotional server 104 (e.g., by the apparatus 200). In one embodiment illustrated in FIG. 5, the sentiments in a consumer review may fall into a sentiment category, e.g., positive, negative, unknown/neutral. In certain embodiments, the sentiment score may be a numerical score, with positive sentiments being positive numbers, negative sentiments being negative numbers, unknown/neutral sentiments being zero, and magnitude of the scores being proportional to the intensity of the sentiments.

In one embodiment, the apparatus 200 may generate a sentiment score for an overall consumer review. In other embodiments, the apparatus 200 may generate a sentiment score for each attribute descriptor identified for a particular commercial entity or object based on a consumer review. In other embodiments, the apparatus 200 may generate a sentiment score for a particular commercial entity or object based on multiple consumer reviews. In other embodiments, the apparatus 200 may generate a sentiment score for each attribute descriptor identified for a particular commercial entity or object based on multiple consumer reviews.

In step 502, the apparatus 200 may receive or access sentiment scores for the different textual units in a consumer review from a non-transitory computer-readable storage device, from an external consumer computing device via a network device, or the like. In step 504, the sentiment scoring engine 214 of the apparatus 200 may determine if the minimum of the sentiment scores exceeds (or is equal to) a predetermined positive minimum threshold and if the average of those scores exceeds (or is equal to) a predetermined positive average threshold. If so, then in step 506, the apparatus 200 may determine that the sentiment for the consumer review is "positive." An exemplary positive minimum threshold may be about 0.3, but is not limited to this exemplary value. An exemplary positive average threshold may be about 1.5, but is not limited to this exemplary value.

Otherwise, in step 508, the sentiment scoring engine 214 of the apparatus 200 may determine if the maximum of those scores is lower than (or is equal to) a predetermined negative maximum threshold and if the average of those scores is lower than (or is equal to) a predetermined negative average threshold. If so, then in step 510, the apparatus 200 may determine that the sentiment for the consumer review is "negative." An exemplary negative maximum threshold may be about −0.1, but is not limited to this exemplary value. An exemplary negative average threshold may be about −2.0, but is not limited to this exemplary value.

Otherwise, in step 512, the sentiment scoring engine 214 of may determine if the minimum of those scores is exceeds (or is equal to) a predetermined unknown minimum threshold and if the maximum of those scores exceeds (or is equal to) a predetermined unknown maximum threshold. If so, then in step 514, the apparatus 200 may determine that the sentiment for the consumer review is "positive." An exemplary unknown minimum threshold may be about 0.0, but is not limited to this exemplary value. An exemplary unknown maximum threshold may be about 1.0, but is not limited to this exemplary value.

Otherwise, in step 516, the sentiment scoring engine 214 may determine if there is only one sentence in the review and if the minimum of the scores exceeds (or is greater than) a predetermined unknown sentence minimum threshold. If so, then in step 518, the apparatus 200 may determine that the sentiment for the consumer review if "positive." An exemplary unknown sentence minimum threshold may be about 0.75, but is not limited to this exemplary value.

Otherwise, in step 520, the sentiment scoring engine 214 that the sentiment for the consumer review is "unknown." Any suitable thresholds may be used in the method of FIG. 5.

The generated attribute descriptors, sentiments and sentiment scores associated with a commercial entity or object may be used in a number of exemplary situations to enable consumer to make informed purchase decisions and to market and advertise products, services and promotions to consumers in a targeted manner.

In one exemplary embodiment, textual units (e.g., sentences) and their associated sentiment scores may be saved in a non-transitory computer-readable storage device to create a repository of consumer feedback from a broad audience.

In one exemplary embodiment, the attribute descriptors identified from consumer reviews may be used to generate survey queries to allow consumers to review and rate commercial entities and objects. For example, exemplary embodiments may analyze consumer reviews associated with one or more restaurants to generate attribute descriptor "burgers" and an associated sentiment "great," and may generate a survey query for Restaurant X to ask consumers "Is Restaurant X great for burgers?" Details of generating survey queries are contained in U.S. Provisional Patent Application No. 62/018,456, filed on Jun. 27, 2014, titled "Method and System for Programmatic Generation of Survey Queries," the entire contents of which are expressly incorporated herein by reference.

In another exemplary embodiment, consumer reviews may be summarized by extracting the most polarized textual units (e.g., sentences) from the reviews. These highly polarized textual units may be positive and/or negative (e.g., "suuuuuper" or "horrid!"). The polarized textual units may be aggregated using simple or complex techniques, and the summarized or aggregated results may be displayed to a consumer to enable the consumer to make an informed purchase. In one exemplary technique of aggregation, the polarized textual units may be repeated. The display may be presented, in one embodiment, when a consumer checks a webpage for a promotion for the commercial entity or object, the promotion provided by a promotion and marketing service. In other embodiments, the display may be provided via an email, a mobile application program, and the like.

In another exemplary embodiment, the most positive and/or most negative consumer reviews for a particular commercial entity or object may be ranked for display to a consumer. The rankings may be based, for example, on the sentiment scores for the consumer reviews. The display may be presented, in one embodiment, when a consumer checks a webpage for a promotion for the commercial entity or object, the promotion provided by a promotion and marketing service. In other embodiments, the display may be provided via an email, a mobile application program, and the like.

In another exemplary embodiment implemented for a promotion and marketing service, after a consumer purchases a promotion for a commercial entity or object, one or more top positive consumer reviews for that commercial entity or object may be displayed for the consumer. The top positive consumer reviews may be identified by the sentiment scores (i.e., highest positive scores) among all of the consumer reviews for that commercial entity or object. The display of the top consumer reviews may encourage the consumer to redeem the promotion. The display may be presented, in one embodiment, on a webpage for the purchase of the promotion right after the consumer purchases the promotion. In other embodiments, the display may be provided via an email, a mobile application program, and the like.

Figure 6:
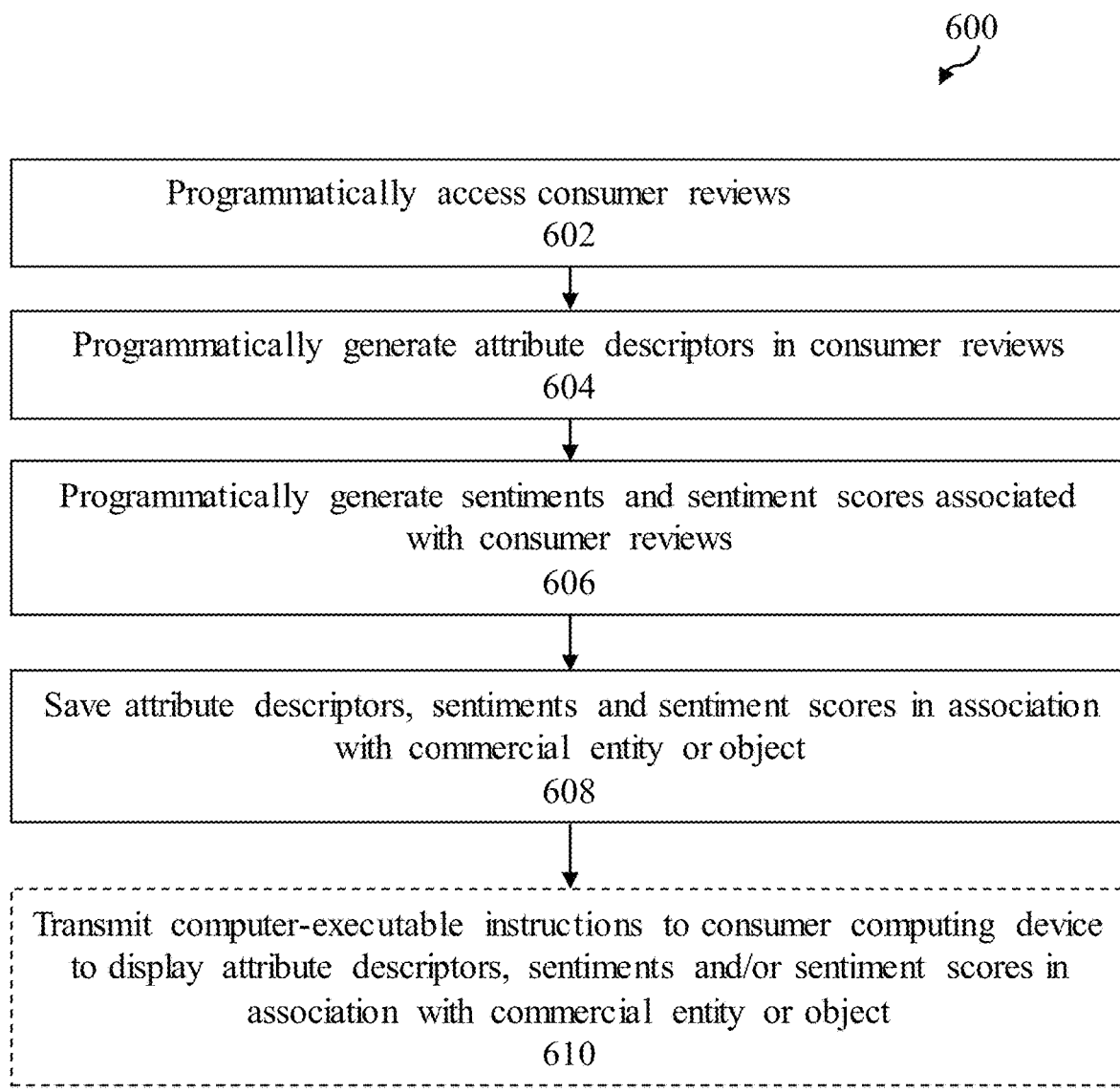
FIGS. 6 and 7 are flowcharts illustrating exemplary computer-executable methods for using consumer review information generated by the methods of FIGS. 4 and 5.
Figure 7:
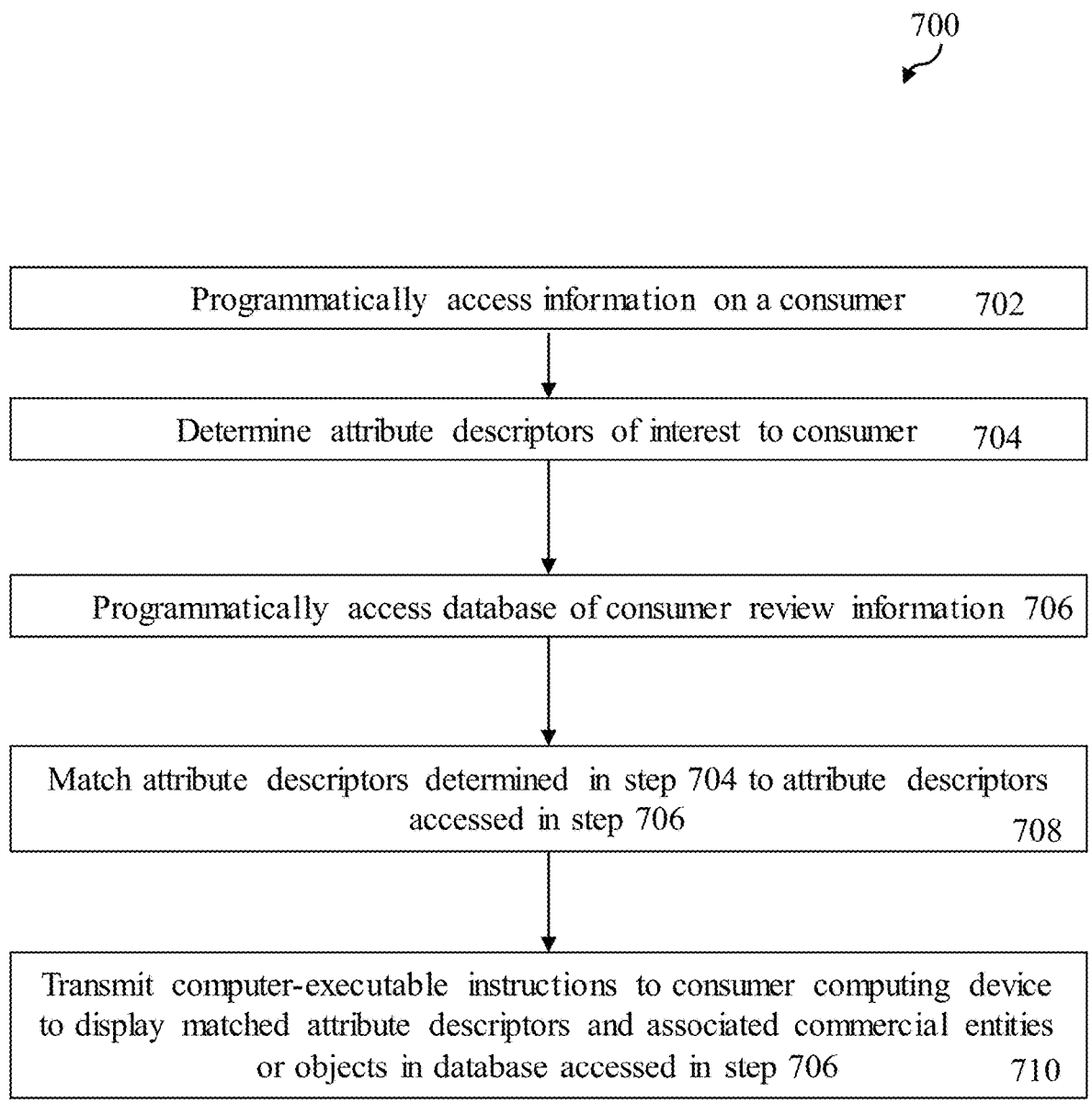

FIGS. 6 and 7 illustrate certain non-limiting exemplary uses of the information programmatically generated using the methods of FIGS. 4 and 5.

FIG. 6 is a flowchart illustrating an exemplary computer-implemented method 600 for programmatically analyzing and processing one or more consumer reviews associated with a commercial entity or object. The operations described in FIG. 6 may be performed by the promotional server 104 (e.g., by the apparatus 200). In step 602, the apparatus 200 may receive or access one or more consumer reviews using, for example, via a network device. The consumer reviews may all correspond to the same commercial entity or object, or may correspond to a plurality of commercial entities or objects.

In step 604, the apparatus 200 may programmatically generate one or more attribute descriptors included in the consumer reviews.

In step 606, the apparatus 200 may programmatically extract sentiments from the consumer reviews, the sentiments indicating some combination of positive, negative, neutral and unknown polarities. In some cases, the apparatus 200 may programmatically generate a sentiment score for each consumer review, the sentiment score indicating an intensity of a sentiment or feeling associated with the consumer review.

In step 608, the apparatus 200 may save the generated attribute descriptors, sentiments and sentiment scores on a non-transitory computer-readable medium in association with the commercial entity or object.

In step 610, in some embodiments, the apparatus 200 may transmit computer-executable instructions to a consumer computing device to cause a visual display associated with the consumer computing device to illustrate the generated attribute descriptors, sentiments and/or sentiment scores in association with the commercial entity or object. The computer-executable instructions may, in some cases, be transmitted in response to a request from the consumer computing device for information on the commercial entity or object. In some cases, the request may specify the commercial entity or object. In some cases, the request may specify one or more attribute descriptors of interest to the consumer and, in response, information on commercial entities or objects having those attribute descriptors may be displayed.

FIG. 7 is a flowchart illustrating an exemplary computer-implemented method 700 for displaying information on a commercial entity or object using consumer review information. The operations described in FIG. 6 may be performed by the promotional server 104 (e.g., by the apparatus 200). In step 702, the apparatus 200 may access or retrieve information regarding a consumer using, for example, a network device. The consumer information may include data on prior activities of the consumer and/or profile data items. The profile data items may include, but are not limited to, an identification of the consumer, an age of the consumer, a gender of the consumer, a race of the consumer, an income of the consumer, a location associated with the consumer (e.g., a residential location, a work location), a merchant preference of the consumer, a category or sub-category of interest to the consumer, a product preference of the consumer, a price preference of the consumer, and the like. The prior activities may include, but are not limited to, one or more purchase activities, one or more product or merchant viewing activities, one or more product or merchant rating activities, one or more promotion viewing activities, one or more promotion rating activities, and the like.

In step 704, the apparatus 200 may generate one or more attribute descriptors of interest to the consumer. For example, if a consumer's prior purchases indicate that he frequents Japanese restaurants, it may be determined that attribute descriptor "sushi" may be an attribute of interest to the consumer.

In step 706, the apparatus 200 may access a database of consumer review information stored in, for instance, a non-transitory computer-readable storage medium. The database may include a list of commercial entities or objects, associated attribute descriptors and associated sentiment scores.

In step 708, the apparatus 200 may match the attribute descriptors of interest determined in step 704 to attribute descriptors in the database accessed in step 706, and may identify corresponding commercial entities or objects in the database.

In step 710, the apparatus 200 may transmit computer-executable instructions to a consumer computing device to cause information on the commercial entities or objects identified in step 708 to be displayed. The displayed information may indicate the commercial entity or object identified, the associated attribute descriptors and/or the associated sentiment scores. In some cases, in step 710, a display of commercial entities or objects on the consumer computing device may be adjusted to rank the commercial entity or object identified in step 708 more highly than other entities or objects.

In some cases, the method of FIG. 7 may be executed to display attribute descriptors and sentiment scores about a particular commercial entity or object to a particular consumer based on a prior activity of the consumer. In one example, if it is determined that the consumer purchased a promotion for a restaurant offered by a promotion and marketing service but has yet to redeem the promotion, then the method of FIG. 7 may be executed to display select information regarding the restaurant to the consumer to encourage him to redeem the promotion. In this case, one or more attribute descriptors of particular interest to the consumer that are in common with attribute descriptors of the restaurant (e.g., "sushi") may be displayed to the consumer with associated sentiment scores for the restaurant. In this manner, the consumer may learn that the restaurant is highly rated for sushi which he is interested in, and may therefore be encouraged to redeem the promotion. In certain cases, negative sentiments may be excluded from a consumer display.

Figure 8A:
FIGS. 8A and 8B illustrate exemplary user interfaces, each recommending a particular merchant to a consumer.
Figure 8B:

FIGS. 8A and 8B illustrate exemplary user interfaces 800a and 800b, respectively, each recommending a particular merchant to a consumer and including an attribute descriptor for the merchant and an associated overall sentiment score determined based on consumer reviews for that merchant (e.g., by averaging sentiment scores for the consumer reviews for that merchant). For example, FIG. 8A indicates an Italian restaurant, an attribute descriptor of "pasta" and an overall sentiment score of "8 out of a total of 10." FIG. 8B indicates a Japanese restaurant, an attribute descriptor of "sushi" and an overall sentiment score of "9 out of a total of 10."

III. EXEMPLARY COMPUTING DEVICES

Systems and methods disclosed herein may include one or more programmable processing units having associated therewith executable instructions held on one or more computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a graphical user interface, according to the present disclosure. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 9:
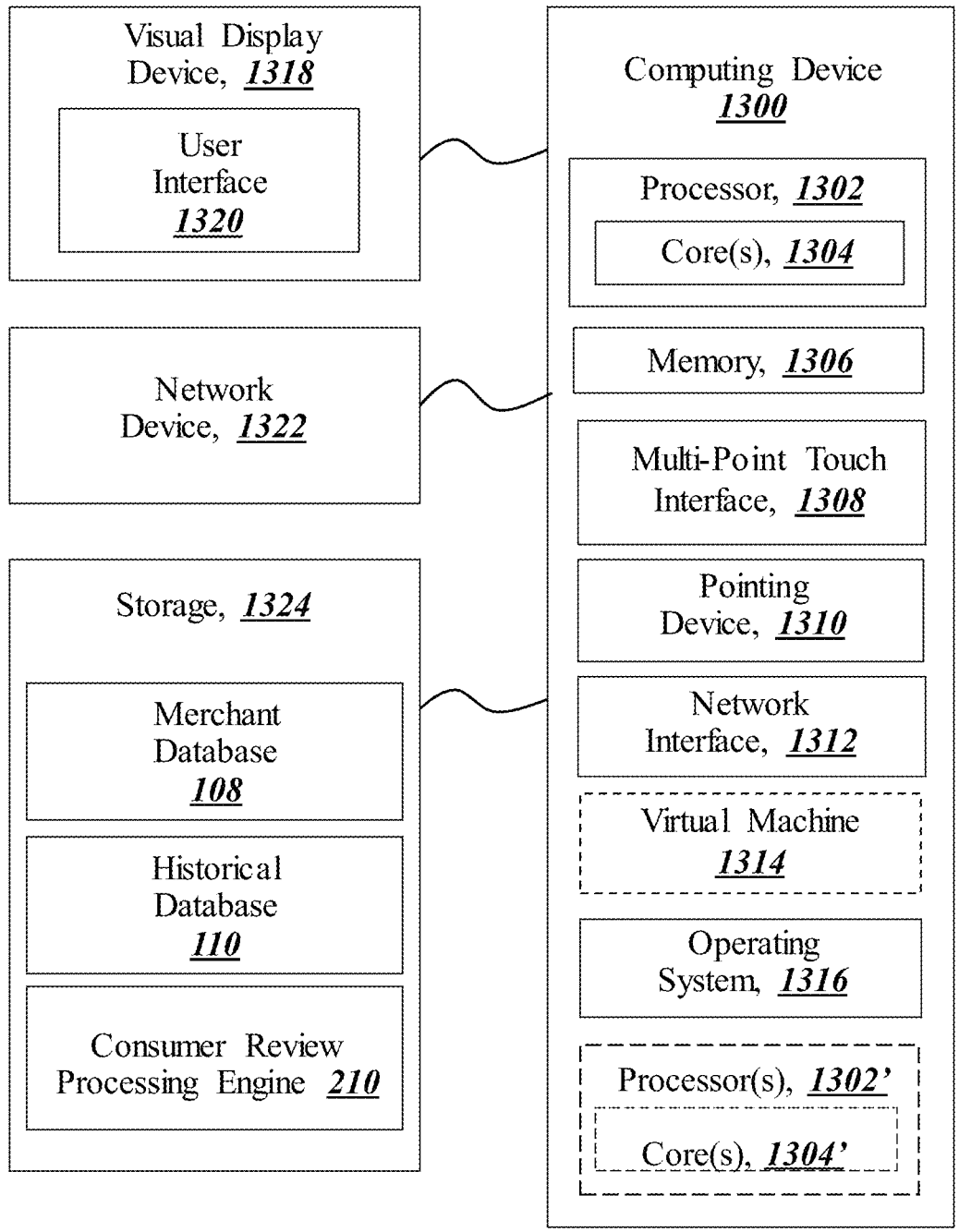
FIG. 9 is a block diagram of an exemplary computing device that may be used to implement and execute exemplary computer-executable methods.

FIG. 9 depicts a block diagram representing an exemplary computing device 1300 that may be used to implement the systems and methods disclosed herein and which may embody the apparatus 200. The computing device 1300 may be any computer system, such as a workstation, desktop computer, server, laptop, handheld computer, tablet computer (e.g., the iPad™ tablet computer), mobile computing or communication device (e.g., the iPhone™/M mobile communication device, the Android™/M mobile communication device, and the like), or other form of computing or telecommunications device that is capable of communication and that has sufficient processor power and memory capacity to perform the operations described herein. In exemplary embodiments, a distributed computational system may include a plurality of such computing devices.

The computing device 1300 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 1306 included in the computing device 1300 may store computer-readable and computer-executable instructions or software for implementing a graphical user interface as described herein. The computing device 1300 also includes processor 1302 and associated core 1304, and in some embodiments, one or more additional processor(s) 1302' and associated core(s) 1304' (for example, in the case of computer systems having multiple processors/cores), for executing computer-readable and computer-executable instructions or software stored in the memory 1302 and other programs for controlling system hardware. Processor 1302 and processor(s) 1302' may each be a single core processor or a multiple core (1304 and 1304') processor.

Virtualization may be employed in the computing device 1300 so that infrastructure and resources in the computing device may be shared dynamically. A virtual machine 1314 may be provided to handle a process running on multiple processors so that the process appears to be using only one computing resource rather than multiple computing resources. Multiple virtual machines may also be used with one processor.

Memory 1306 may include a computer system memory or random access memory, such as DRAM, SRAM, EDO RAM, and the like. Memory 1306 may include other types of memory as well, or combinations thereof.

A user may interact with the computing device 1300 through a visual display device 1318, such as a screen or monitor, which may display one or more graphical user interfaces 1320 provided in accordance with exemplary embodiments described herein. The visual display device 1318 may also display other aspects, elements and/or information or data associated with exemplary embodiments.

The computing device 1300 may include other I/O devices for receiving input from a user, for example, a keyboard or any suitable multi-point touch interface 1308 or pointing device 1310 (e.g., a mouse, a user's finger interfacing directly with a display device). As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, and the like. Exemplary pointing devices may include, but are not limited to, a mouse, a touchpad, a finger of the user interfacing directly with a display device, and the like.

The keyboard 1308 and the pointing device 1310 may be coupled to the visual display device 1318. The computing device 1300 may include other suitable conventional I/O peripherals. The I/O devices may facilitate implementation of the one or more graphical user interfaces 1320, for example, implement one or more of the graphical user interfaces described herein.

The computing device 1300 may include one or more storage devices 1324, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 1324 may provide storage for data that may be generated by the systems and methods of the present disclosure. For example, a storage device 1324 may provide storage for a merchant database 108 including information on one or more merchants, and for a historical database 110 including information on one or more prior activities performed by consumers and profile information on consumers. A storage device 1324 may also provide storage for a consumer review processing engine 210. The one or more storage devices 1324 may be provided on the computing device 1300 and/or provided separately or remotely from the computing device 1300. The exemplary components depicted as being stored on storage device 1324 may be stored on the same or on different storage devices.

The computing device 1300 may include a network interface 1312 configured to interface via one or more network devices 1322 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 1312 may include a built-in network adapter, network interface card, PCMCIA network card, card bus network adapter, wireless network adapter, USB network adapter, modem or any other device suitable for interfacing the computing device 1300 to any type of network capable of communication and performing the operations described herein. The network device 1322 may include one or more suitable devices for receiving and transmitting communications over the network including, but not limited to, one or more receivers, one or more transmitters, one or more transceivers, one or more antennae, and the like.

The computing device 1300 may run any operating system 1316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1316 may be run in native mode or emulated mode. In an exemplary embodiment, the operating system 1316 may be run on one or more cloud machine instances.

One of ordinary skill in the art will recognize that exemplary computing device 1300 may include more or fewer modules than those shown in FIG. 9.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications, combinations and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

What is claimed is:

1. An apparatus for programmatically parsing and analyzing a consumer review extracted from an Internet website, wherein the consumer review is associated with a commercial entity or with a commercial object, the apparatus comprising:
   a processor configured to programmatically access, via a networked device, the consumer review; and
   a consumer review processing engine programmed to: (a) programmatically identify an attribute descriptor set from the consumer review, and (b) programmatically generate a consumer review sentiment score associated with the consumer review, wherein programmatically generating the consumer review sentiment score comprises:
      using a natural language processing engine to:
         programmatically parse the consumer review into a sentence set;
         programmatically parse each sentence of the sentence set into a word set; and
         for each word in each word set, programmatically generate a word part of speech and a word context of use; and
      using a sentiment scoring engine to:
         for each word in each word set, programmatically generate a word sentiment score, wherein programmatically generating the word sentiment score comprises: generating (1) a word polarity score using the word part of speech and the word context of use, (2) a word negation score, and (3) a word intensity score;
         for each sentence in the sentence set, programmatically generating a sentence sentiment score using a machine learning algorithm trained based on word sentiment scores, word polarity scores, word intensity scores, and word negation scores associated with each respective sentence; and
         programmatically generate the consumer review sentiment score by aggregating the sentence sentiment scores for each sentence of the sentence set;
      programmatically storing the attribute descriptor set, the sentence sentiment scores, and the consumer review sentiment score to a non-transitory computer-readable storage device in association with the commercial entity or the commercial object;
      determine one or more attribute descriptors of the attribute descriptor set that are relevant to a consumer associated with a computing device; and
      cause the networked device to transmit one or more computer-executable instructions to the computing device, the one or more computer-executable instructions being programmed to cause the computing device to visually display the one or more attribute descriptors and the consumer review sentiment score in association with the commercial entity or the commercial object.

2. The apparatus of claim 1, wherein generating the word polarity score further comprises aggregating constituent word polarity scores from constituent word polarity score sources.

3. The apparatus of claim 2, wherein one or more constituent word polarity score sources are annotated polarity lexicons.

4. The apparatus of claim 1, wherein the consumer review sentiment score is associated with the attribute descriptor set.

5. The apparatus of claim 1, wherein the consumer review sentiment score is associated with the commercial entity or with the commercial object, but not specifically with the attribute descriptor set.

6. The apparatus of claim 1, wherein programmatically generating a first sentence sentiment score for a first sentence in the consumer review comprises:
   programmatically identifying one or more emoticons in the first sentence; and
   assigning one or more emoticon scores to the one or more emoticons based on sentiments expressed in the one or more emoticons;
   wherein the first sentence sentiment score is determined based on the one or more emoticon scores.

7. The apparatus of claim 1, wherein the consumer review processing engine is further configured to:
   programmatically analyze prior purchase data or profile data associated with a first consumer to generate a first attribute descriptor set of interest to the first consumer;
   programmatically match the first attribute descriptor set of interest to the first consumer to the attribute descriptor set identified in the consumer review; and
   wherein the processor is further configured to, based on the matching, cause the networked device to transmit computer-executable instructions to a computing device associated with the first consumer to cause a visual display device associated with the computing device to display the attribute descriptor set and the consumer review sentiment score in association with the commercial entity or the commercial object.

8. The apparatus of claim 1, wherein the commercial entity is a merchant.

9. The apparatus of claim 1, wherein the commercial object is a product, a service, or a promotion.

10. The apparatus of claim 1, wherein the attribute descriptor set indicates a context associated with the commercial entity or the commercial object.

11. The apparatus of claim 1, wherein the attribute descriptor set indicates a quality associated with the commercial entity or the commercial object.

12. The apparatus of claim 1, wherein the attribute descriptor set indicates a category or sub-category associated with the commercial entity or the commercial object.

13. A computer-executed method for programmatically parsing and analyzing a consumer review extracted from an Internet website, wherein the consumer review is associated with a commercial entity or with a commercial object, the computer-executed method comprising:
   programmatically accessing, via a networked device, the consumer review; and
   executing a consumer review processing engine to: (a) programmatically identify an attribute descriptor set from the consumer review, and (b) programmatically generate a consumer review sentiment score associated with the consumer review, wherein programmatically generating the consumer review sentiment score comprises:

using a natural language processing engine to:
programmatically parse the consumer review into a sentence set;
programmatically parse each sentence of the sentence set into a word set; and
for each word in each word set, programmatically generate a word part of speech and a word context of use; and using a sentiment scoring engine to:
for each word in each word set, programmatically generate a word sentiment score, wherein programmatically generating the word sentiment score comprises: generating (1) a word polarity score using the word part of speech and the word context of use, (2) a word negation score, and (3) a word intensity score;
for each sentence in the sentence set, programmatically generate a sentence sentiment score using a machine learning algorithm trained based on word sentiment scores, word polarity scores, word intensity scores, and word negation scores associated with each respective sentence; and
programmatically generate the consumer review sentiment score by aggregating the sentence sentiment scores for each sentence of the sentence set;

programmatically storing the attribute descriptor set, the sentence sentiment scores, and the consumer review sentiment score to a non-transitory computer-readable storage device in association with the commercial entity or the commercial object;

determining one or more attribute descriptors of the attribute descriptor set that are relevant to a consumer associated with a computing device; and transmitting computer-executable instructions to the computing device, the one or more computer-executable instructions being programmed to cause the computing device to visually display the one or more attribute descriptors and the consumer review sentiment score in association with the commercial entity or the commercial object.

14. The method of claim 13, wherein generating the word polarity score further comprises aggregating constituent word polarity scores from constituent word polarity score sources.

15. The method of claim 14, wherein one or more constituent word polarity score sources are annotated polarity lexicons.

16. The method of claim 13, wherein the consumer review sentiment score is associated with the attribute descriptor set.

17. The method of claim 13, wherein the consumer review sentiment score is associated with the commercial entity or with the commercial object, but not specifically with the attribute descriptor set.

18. The method of claim 13, wherein programmatically generating a first sentence sentiment score for a first sentence in the consumer review comprises:
programmatically identifying one or more emoticons in the first sentence; and
assigning one or more emoticon scores to the one or more emoticons based on sentiments expressed in the one or more emoticons;
wherein the first sentence sentiment score is determined based on the one or more emoticon scores.

19. The method of claim 13, further comprising:
programmatically analyzing prior purchase data or profile data associated with a first consumer to generate a first attribute descriptor set of interest to the first consumer;
programmatically matching the first attribute descriptor set of interest to the first consumer to the attribute descriptor set identified from the consumer review; and
based on the matching, transmitting computer-executable instructions to a computing device associated with the first consumer to cause a visual display device associated with the computing device to display the attribute descriptor set and the consumer review sentiment score in association with the commercial entity or with the commercial object.

20. The method of claim 13, wherein the commercial entity is a merchant.

21. The method of claim 13, wherein the commercial object is a product, a service, or a promotion.

22. The method of claim 13, wherein the attribute descriptor set indicates a context associated with the commercial entity or with the commercial object.

23. The method of claim 13, wherein the attribute descriptor set indicates a quality associated with the commercial entity or with the commercial object.

24. The method of claim 13, wherein the attribute descriptor set indicates a category or sub-category associated with the commercial entity or with the commercial object.

25. A computer program product for programmatically parsing and analyzing a consumer review extracted from an Internet website, wherein the consumer review is associated with a commercial entity or with a commercial object, the computer program product stored on a computer readable medium, and the computer program product comprising instructions that when executed by one or more computers cause the one or more computers to:

access, via a networked device, the consumer review;
identify an attribute descriptor set from the consumer review, and generate a consumer review sentiment score associated with the consumer review, wherein generating the sentiment score comprises:
using a natural language processing engine to:
parse the consumer review into a sentence set;
parse each sentence of the sentence set into a word set; and
for each word in each word set, generate a word part of speech and a word context of use; and
using a sentiment scoring engine to:
for each word in each word set, generate a word sentiment score, wherein generating the word sentiment score comprises: generating (1) a word polarity score using the word part of speech and the word context of use, (2) a word negation score, and (3) a word intensity score;
for each sentence in the sentence set, generating a sentence sentiment score using a machine learning algorithm trained based on word sentiment scores, word polarity scores, word intensity scores, and word negation scores associated with each respective sentence; and
generate the consumer review sentiment score by aggregating the sentence sentiment scores for each sentence of the sentence set;

store the attribute descriptor set, the sentence sentiment scores, and the consumer review sentiment score in association with the commercial entity or the commercial object;

determine one or more attribute descriptors of the attribute descriptor set that are relevant to a consumer associated with a computing device; and transmit computer-executable instructions to the computing device, the one or more computer-executable instructions being programmed to cause the computing device to visually display the one or more attribute descriptors and the consumer review sentiment score in association with the commercial entity or the commercial object.

* * * * *

UNITED STATES PATENT AND TRADEMARK OFFICE
CERTIFICATE OF CORRECTION

| | | |
|---|---|---|
| PATENT NO. | : 12,073,444 B2 | Page 1 of 1 |
| APPLICATION NO. | : 17/132915 | |
| DATED | : August 27, 2024 | |
| INVENTOR(S) | : Gaston L'Huillier et al. | |

It is certified that error appears in the above-identified patent and that said Letters Patent is hereby corrected as shown below:

On the Title Page

Item (71), Applicant, Line 1, delete "GROUPON, INC., Chicago, IL (US)" and insert -- Bytedance Inc., Wilmington, DE (US) --, therefor.

Signed and Sealed this
Seventeenth Day of December, 2024

Derrick Brent
*Acting Director of the United States Patent and Trademark Office*